United States Patent
Shinke et al.

(10) Patent No.: US 12,060,449 B2
(45) Date of Patent: Aug. 13, 2024

(54) POLYMER, METHOD OF PRODUCING POLYMER, AND RUBBER COMPOSITION

(71) Applicant: THE YOKOHAMA RUBBER CO., LTD., Tokyo (JP)

(72) Inventors: Yu Shinke, Hiratsuka (JP); Kazuya Uenishi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1030 days.

(21) Appl. No.: 16/762,031

(22) PCT Filed: Nov. 12, 2018

(86) PCT No.: PCT/JP2018/041832
§ 371 (c)(1),
(2) Date: May 6, 2020

(87) PCT Pub. No.: WO2019/093512
PCT Pub. Date: May 16, 2019

(65) Prior Publication Data
US 2020/0339720 A1    Oct. 29, 2020

(30) Foreign Application Priority Data

Nov. 13, 2017 (JP) ................................ 2017-218046
Nov. 13, 2017 (JP) ................................ 2017-218049
Dec. 27, 2017 (JP) ................................ 2017-250420

(51) Int. Cl.
*C08F 236/20* (2006.01)
*B60C 1/00* (2006.01)
(Continued)

(52) U.S. Cl.
CPC .............. *C08F 236/20* (2013.01); *C08K 3/04* (2013.01); *C08K 3/36* (2013.01); *C08K 11/005* (2013.01);
(Continued)

(58) Field of Classification Search
None
See application file for complete search history.

(56) References Cited

U.S. PATENT DOCUMENTS 3,373,132 A * 3/1968 Sutter .................... C08C 19/20
525/333.2
3,419,539 A * 12/1968 Ueda .................... C08F 136/06
502/229
(Continued)

FOREIGN PATENT DOCUMENTS

GB 910216 * 11/1962
JP S47-043312 B1 11/1972
(Continued)

*Primary Examiner* — Joseph D Anthony
(74) *Attorney, Agent, or Firm* — Carrier, Shende & Associates P.C.; Fulchand P. Shende; Joseph P. Carrier

(57) ABSTRACT

A polymer includes a repeating unit represented by Formula (1) and/or a repeating unit represented by Formula (2), and a repeating unit represented by Formula (3) and/or a repeating unit represented by Formula (4), where a proportion of a total of the repeating unit represented by Formula (1) and the repeating unit represented by Formula (2) is greater than 0 mol % but ≤100 mol %; a proportion of a total of the repeating unit represented by Formula (3) and the repeating unit represented by Formula (4) is ≥0 mol % but less than 100 mol %; a proportion of a total of the repeating unit represented by Formula (1) and the repeating unit represented by Formula (3) is ≥20 mol %; and a proportion of a total of the repeating unit represented by Formula (2) and the repeating unit represented by Formula (4) is ≤80 mol %.

(1)

(Continued)

-continued

2 Claims, 1 Drawing Sheet

(51) Int. Cl.
*C08K 3/04* (2006.01)
*C08K 3/36* (2006.01)
*C08K 11/00* (2006.01)
*C08L 19/00* (2006.01)

(52) U.S. Cl.
CPC .......... *C08L 19/006* (2013.01); *B60C 1/0016* (2013.01); *C08F 2800/10* (2013.01)

(56) References Cited

U.S. PATENT DOCUMENTS

| | | | |
|---|---|---|---|
| 3,595,850 A * | 7/1971 | Takayangi et al. ... | C08F 136/06 526/86 |
| 3,629,084 A * | 12/1971 | Soldatos ................. | C08K 3/06 204/168 |
| 5,043,408 A | 8/1991 | Kakugo et al. | |
| 2011/0077325 A1 * | 3/2011 | Luo ........................ | C08F 136/06 525/102 |
| 2016/0032030 A1 * | 2/2016 | Luo ........................ | C08F 136/06 525/374 |

FOREIGN PATENT DOCUMENTS

| | | |
|---|---|---|
| JP | S51-054520 A | 5/1976 |
| JP | 52-009098 A | 1/1977 |
| JP | H03-250007 A | 11/1991 |
| JP | 2002-265720 A | 9/2002 |
| WO | 2014/021244 A1 | 2/2014 |

\* cited by examiner

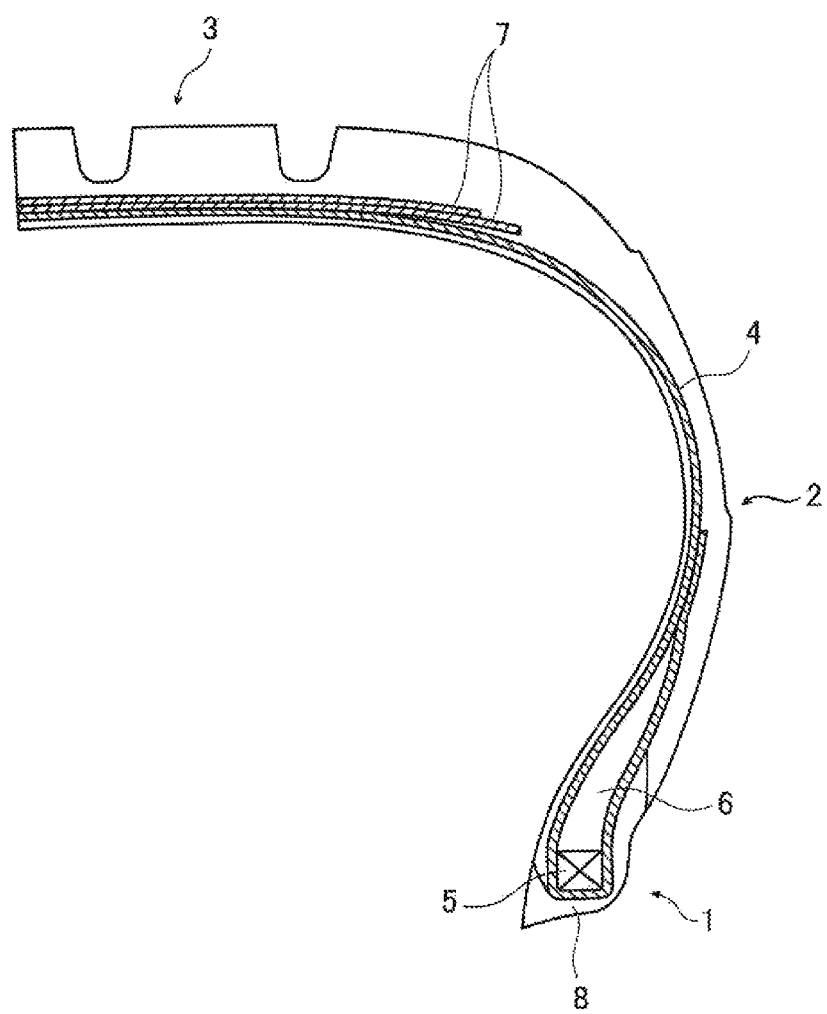

POLYMER, METHOD OF PRODUCING POLYMER, AND RUBBER COMPOSITION

TECHNICAL FIELD

The present invention relates to a polymer, a method of producing a polymer, and a rubber composition.

BACKGROUND ART

As a polymer with excellent mechanical properties, a polymer of olefin, aromatic vinyl, and diene (olefin-aromatic vinyl-diene polymers) is known (e.g. Patent Document 1). Also, as a polymer with excellent mechanical properties, a polymer of ethylene and aromatic vinyl (ethylene-aromatic vinyl polymers) is known (e.g. Patent Document 2).

CITATION LIST

Patent List

Patent Document 1: JP 2002-265720 A
Patent Document 2: JP 03-250007 A

SUMMARY OF INVENTION

Technical Problem

The present inventors produced a polymer of ethylene, styrene, and butadiene (ethylene-styrene-butadiene polymer) using Patent Document 1 as a reference, and found that the obtained polymer easily underwent oxidation degradation when heated (suggesting insufficient resistance to oxidation degradation).

Further, a rubber composition was prepared by blending carbon black and silica with the polymer (ethylene-styrene-butadiene polymer), and it was found that the obtained rubber composition lacked toughness and easily underwent oxidation degradation when heated (suggesting insufficient resistance to oxidation degradation).

Furthermore, the present inventors produced a polymer of ethylene and styrene (ethylene-styrene polymer) based on Examples of Patent Document 2, and found that the obtained polymer easily underwent oxidation degradation when heated (suggesting insufficient resistance to oxidation degradation).

In light of these circumstances, an object of the present invention is to provide a polymer having excellent resistance to oxidation degradation, a method of producing the polymer, and a rubber composition being excellent in toughness and resistance to oxidation degradation.

Solution to Problem

After diligent study on the problems described above by the present inventors, they discovered the following: (i) in the case where an ethylene-styrene-butadiene polymer is produced by the method described in Patent Document 1, head-to-head linkages ([—$CH_2$—$CH(C_5H_6)$—][—CH($C_5H_6$)—$CH_2$—]) and/or head-to-tail linkages ([—CH($C_5H_6$)—$CH_2$—][—CH($C_5H_6$)—$CH_2$—]) having styrene units are present in the polymer, and these linkages are difficult to eliminate completely; and in the case where an ethylene-styrene polymer is produced by the method described in Patent Document 2, although a small amount, head-to-head linkages ([—$CH_2$—$CH(C_5H_6)$—][—CH($C_5H_6$)—$CH_2$—]) and/or head-to-tail linkages ([—CH($C_5H_6$)—$CH_2$—][—CH($C_5H_6$)—$CH_2$—]) having styrene units are present in the polymer, and these linkages are difficult to eliminate completely, and (ii) those linkages described above have a small bond energy and can be easily cut (particularly so by oxidation when heated). Note that, hereinafter, among those linkages having styrene units, the linkages except for a tail-to-tail linkage ([—CH($C_5H_6$)—$CH_2$—][—$CH_2$—CH($C_5H_6$)—]), namely, a head-to-head linkage ([—$CH_2$—CH($C_5H_6$)—][—CH($C_5H_6$)—$CH_2$—]) and a head-to-tail linkage ([—CH($C_5H_6$)—$CH_2$—][—CH($C_5H_6$)—$CH_2$—]) are collectively also referred to as a "styrene linkage". Likewise, among linkages having aromatic vinyl units, the linkages except for a tail-to-tail linkage, namely, a head-to head linkage and a head-to-tail linkage are collectively also referred to as "aromatic vinyl linkage".

The present invention is based on the knowledge described above, and some specific configurations are as follows.

(1) A polymer including a repeating unit represented by Formula (1) below and/or a repeating unit represented by Formula (2) below, and a repeating unit represented by Formula (3) below and/or a repeating unit represented by Formula (4) below, where among all the repeating units, a proportion of a total of the repeating unit represented by Formula (1) and the repeating unit represented by Formula (2) is greater than 0 mol % but 100 mol % or less;

among all the repeating units, a proportion of a total of the repeating unit represented by Formula (3) and the repeating unit represented by Formula (4) being 0 mol % or greater but less than 100 mol %;

among all the repeating units, a proportion of a total of the repeating unit represented by Formula (1) and the repeating unit represented by Formula (3) is 20 mol % or greater; and among all the repeating units, a proportion of a total of the repeating unit represented by Formula (2) and the repeating unit represented by Formula (4) is 80 mol % or less.

(2) The polymer according to (1) above, where among all the repeating units, the proportion of the total of the repeating unit represented by Formula (1) and the repeating unit represented by Formula (2) is from 0.1 to 60 mol %; and among all the repeating units, the proportion of the total of the repeating unit represented by Formula (3) and the repeating unit represented by Formula (4) is from 40 to 99.9 mol %.

(3) The polymer according to (1) or (2) above, where the aromatic hydrocarbon group is an aromatic hydrocarbon group having a substituent.

(4) The polymer according to (3) above, where the substituent is an electron donating group.

(5) The polymer according to (4) above, where the electron donating group is an alkoxy group.

(6) A method of producing a polymer comprising reacting a diene polymer with an aromatic hydrocarbon that may have a substituent in the presence of a Lewis acid catalyst to produce the polymer according to any one of (1) to (5) above, where the diene polymer includes a repeating unit represented by Formula (3) below and/or a repeating unit represented by Formula (4) below; among all the repeating units, a proportion of the repeating unit represented by Formula (3) being 20 mol % or greater; and among all the repeating units, a proportion of the repeating unit represented by Formula (4) being 80 mol % or less.

(7) The method of producing a polymer according to (6) above, where the aromatic hydrocarbon is an aromatic hydrocarbon having a substituent.

(8) The method of producing a polymer according to (7) above, where the substituent that the aromatic hydrocarbon has is an electron donating group.

(9) The method of producing a polymer according to (8) above, where the electron donating group of the substituent that the aromatic hydrocarbon has is an alkoxy group.

(10) A rubber composition comprising a rubber component containing the polymer according to any one of (1) to (5) above, and carbon black and/or silica.

(11) The rubber composition according to (10) above, where a content of the silica is 10 parts by mass or greater per 100 parts by mass of the rubber component.

Advantageous Effects of Invention

As described below, according to an embodiment of the present invention, a polymer having excellent resistance to oxidation degradation, a method of producing the polymer, and a rubber composition being excellent in toughness and resistance to oxidation degradation can be provided.

BRIEF DESCRIPTION OF DRAWINGS

FIG. 1 is a partial cross-sectional schematic view that represents a pneumatic tire according to an embodiment of the present invention.

DESCRIPTION OF EMBODIMENTS

The polymer and the method of producing the polymer according to embodiments of the present invention, and the rubber composition according to an embodiment of the present invention are described below.

In the present specification, numerical ranges indicated using "(from) . . . to . . . " include the former number as the lower limit value and the latter number as the upper limit value.

Polymer

The polymer according to an embodiment of the present invention includes a repeating unit represented by Formula (1) below and/or a repeating unit represented by Formula (2) below, and a repeating unit represented by Formula (3) below and/or a repeating unit represented by Formula (4) below, where among all the repeating units, a proportion of a total of the repeating unit represented by Formula (1) and the repeating unit represented by Formula (2) is greater than 0 mol % but 100 mol % or less;

among all the repeating units, a proportion of a total of the repeating unit represented by Formula (3) and the repeating unit represented by Formula (4) is 0 mol % or greater but less than 100 mol %;

among all the repeating units, a proportion of a total of the repeating unit represented by Formula (1) and the repeating unit represented by Formula (3) is 20 mol % or greater; and among all the repeating units, a proportion of a total of the repeating unit represented by Formula (2) and the repeating unit represented by Formula (4) is 80 mol % or less.

The polymer of an embodiment of the present invention is thought to achieve the effects described above as a result of having such a configuration. Although the reason for this is unclear, as is apparent from Formula (1) to Formula (4) described below, since the polymer according to an embodiment of the present invention contains no aromatic vinyl linkage which has a small bond energy, it is conceived that the polymer is less likely to be cut by oxidation when heated.

First, the polymer according to an embodiment of the present invention is described by using specific examples.

The following structural formula indicates a part of the polymer (a part of the high molecular chain) for an aspect in the case where the polymer according to an embodiment of the present invention is a polymer formed from a repeating unit represented by Formula (1) below and a repeating unit represented by Formula (3) below. In the structural formula, Ph represents a phenyl group, and a number represents the formula number.

[Chemical Formula 1]

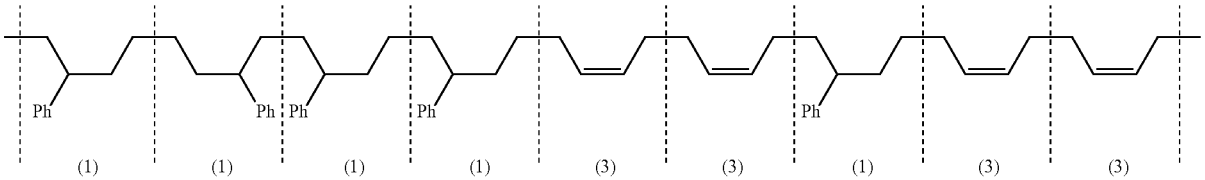

The structural formula above has the same structure as the copolymer of olefin (O), styrene (S), and butadiene (B) as described below.

[Chemical Formula 2]

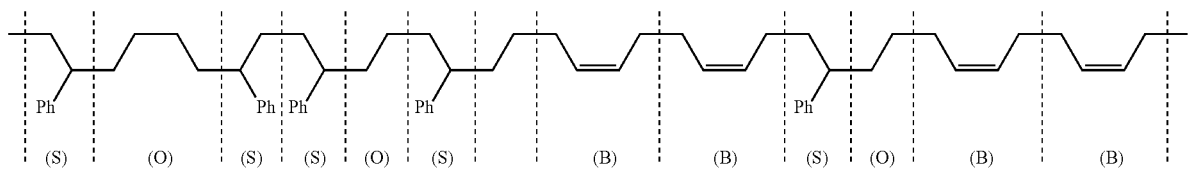

Note that, in the case where styrene (S) is adjacent to each other, a tail-to-tail linkage ([—CH($C_5H_6$)—$CH_2$—][—$CH_2$—CH($C_5H_6$)—]) is always formed, and a head-to-tail linkage and a head-to-head linkage are never formed. As described above, the polymer according to an embodiment of the present invention has no styrene linkage (aromatic vinyl linkage). Note that, as described above, in the present specification, "styrene linkage (aromatic vinyl linkage)" refers to linkages other than the tail-to-tail linkage, that is, refers to the head-to-head linkage and the head-to-tail linkage.

Each of the repeating units is described below.

[Chemical Formula 3]

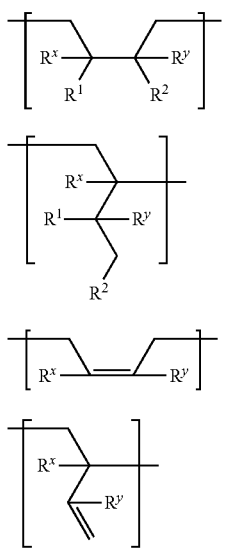

In Formula (1) and Formula (2), one of $R^1$ and $R^2$ represents an aromatic hydrocarbon group that may have a substituent, and the other one represents a hydrogen atom.

In Formula (1) to Formula (4), $R^x$ and $R^y$ each represent a hydrogen atom, an alkyl group, or a halogen atom. However, at least one of $R^x$ and $R^y$ represents a hydrogen atom.

In the polymer according to an embodiment of the present invention, the order of the repeating units is not particularly limited.

Furthermore, the repeating unit represented by Formula (3) above is not distinguishing geometric isomers. That is, the repeating unit represented by Formula (3) above contains both the cis structure and the trans structure.

Aromatic Hydrocarbon Group

As described above, in Formula (1) and Formula (2), one of $R^1$ and $R^2$ represents an aromatic hydrocarbon group that may have a substituent. The aromatic hydrocarbon group may be an aryl group or a heteroaryl group. That is, the aromatic hydrocarbon group may be a heterocyclic aromatic hydrocarbon group (heteroaryl group).

From the perspective of achieving superior effect of the present invention, the aromatic hydrocarbon group is preferably an aromatic hydrocarbon group having a substituent.

The ring constituting the aromatic hydrocarbon group is not particularly limited; however, from the perspective of achieving superior effect of the present invention, the ring is preferably an aromatic hydrocarbon ring having from 3 to 30 carbons, and more preferably an aromatic hydrocarbon ring having from 6 to 20 carbons.

Specific examples of the ring constituting the aromatic hydrocarbon group include a benzene ring, naphthalene ring, anthracene ring, phenanthrene ring, fluorene ring, triphenylene ring, naphthacene ring, oxazole ring, furan ring, and pyridine ring.

Substituent

Substituents are not particularly limited; however, from the perspective of achieving superior effect of the present invention, substituents are preferably an electron donating group.

Note that, in the present specification, the electron donating group refers to a substituent having the Hammett substituent constant $\sigma_p$ of 0 or less. Although the lower limit of the Hammett substituent constant $\sigma_p$ of the electron donating group is not particularly limited, the lower limit is preferably −0.8 or greater from the perspective of achieving superior effect of the present invention.

The Hammett substituent constant $\sigma_p$ is described. The Hammett equation is an empirical rule proposed by L. P. Hammett in 1935 to quantitatively discuss the effect of substituent on a reaction or equilibrium of a benzene derivative, and the validity thereof has been widely accepted. The substituent constants determined by the Hammett equation include $\sigma_p$ and $\sigma_m$, and these values are found in a large number of literature in general. For example, details are found in "Lange's and book of Chemistry", edited by J. A. Dean, 12th edition, 1979 (McGraw-Hill) and "Field of Chemistry", Special Edition, vol. 122, pp. 96-103, 1979 (Nankodo). Note that, although an electron donating group may be limited or explained by the Hammett substituent constant $\sigma_p$ in the present specification, this does not mean that such an electron donating group is limited only to substituents having known values found in the literature described above. Even if the value is not known in the literature, in the case where a value is measured based on the Hammett equation, a substituent having the value within the range is included.

Specific examples of the electron donating group include a hydroxy group or salts thereof, a mercapto group or salts thereof, alkyl groups (preferably having from 1 to 30 carbons), alkoxy groups (preferably having from 1 to 30 carbons), aryloxy groups (preferably having from 6 to 20 carbons), heterocyclic oxy groups, alkylthio groups (RS-: R represents an alkyl group (preferably having from 1 to 30 carbons)), arylthio groups (preferably having from 6 to 20 carbons), heterocyclic thio groups, an amino group, alkylamino groups ($R^1R^2N$—: $R^1$ and $R^2$ each independently represent a hydrogen atom or an alkyl group (preferably having from 1 to 30 carbons); however, at least one of $R^1$ and $R^2$ represents an alkyl group), arylamino groups (preferably having from 6 to 20 carbons), and heterocyclic amino group. Among these, from the perspective of achieving superior effect of the present invention, a group having the Hammett substituent constant $\sigma_p$ of −0.15 or less is preferred. Specifically, a group other than alkyl groups which has the Hammett substituent constant $\sigma_p$ of −0.15 or over is preferred, and an alkoxy group is more preferred.

Note that, in the case where the aromatic hydrocarbon group has two or more substituents, the substituents may bond to each other to form a ring. For example, the propylenyl groups substituted for adjacent carbons of a phenyl group may be bonded to each other to form a benzene ring (as a whole, becoming a naphthyl group).

Examples of the aromatic hydrocarbon group having a substituent include a tolyl group (toluene group), a methoxyphenyl group (anisole group), and a naphthyl group.

$R^x$ and $R^y$

As described above, in Formula (1) to Formula (4), $R^x$ and $R^y$ each represent a hydrogen atom, an alkyl group, or a halogen atom. However, at least one of $R^x$ and $R^y$ represents a hydrogen atom.

From the perspective of achieving superior effect of the present invention, $R^x$ and $R^y$ described above are preferably each a hydrogen atom.

The alkyl group is not particularly limited; however, from the perspective of achieving superior effect of the present invention, the alkyl group is preferably an alkyl group having from 1 to 10 carbons, and more preferably a methyl group.

The halogen atom is not particularly limited; however, from the perspective of achieving superior effect of the present invention, the halogen atom is preferably a chlorine atom.

Proportion of Repeating Units

Proportions of the repeating units are described below.

Note that the polymer according to an embodiment of the present invention is formed from the repeating unit represented by Formula (1) above and/or the repeating unit represented by Formula (2) above, and the repeating unit represented by Formula (3) and/or the repeating unit represented by Formula (4) below. Therefore, among all the repeating units, a total of the proportion of the repeating unit represented by Formula (1) above, the proportion of the repeating unit represented by Formula (2) above, the proportion of the repeating unit represented by Formula (3) above, and the proportion of the repeating unit represented by Formula (4) above is 100 mol %.

Formula (1)

From the perspective of achieving superior effect of the present invention, among all the repeating units, the proportion of the repeating unit represented by Formula (1) above (hereinafter, also referred to as "d1") is preferably from 1 to 50 mol %, and more preferably from 5 to 40 mol %.

Formula (2)

From the perspective of achieving superior effect of the present invention, among all the repeating units, the proportion of the repeating unit represented by Formula (2) above (hereinafter, also referred to as "d2") is preferably from 1 to 50 mol %, and more preferably from 5 to 40 mol %.

Formula (3)

From the perspective of achieving superior effect of the present invention, among all the repeating units, the proportion of the repeating unit represented by Formula (3) above (hereinafter, also referred to as "d3") is preferably from 30 to 95 mol %, and more preferably from 60 to 90 mol %.

Formula (4)

From the perspective of achieving superior effect of the present invention, among all the repeating units, the proportion of the repeating unit represented by Formula (4) above (hereinafter, also referred to as "d4") is preferably from 1 to 70 mol %, and more preferably from 5 to 60 mol %.

Formula (1)+Formula (2)

Among all the repeating units, a proportion of a total of the repeating unit represented by Formula (1) above and the repeating unit represented by Formula (2) above (hereinafter, also referred to as "d1+d2") is greater than 0 mol % but 100 mol % or less. Especially, from the perspective of achieving superior effects of the present invention, such a proportion is preferably from 0.1 to 60 mol %, more preferably from 1 to 50 mol %, and even more preferably from 5 to 40 mol %.

Formula (3)+Formula (4)

Among all the repeating units, a proportion of a total of the repeating unit represented by Formula (3) above and the repeating unit represented by Formula (4) above (hereinafter, also referred to as "d3+d4") is 0 mol % or greater but less than 100 mol %. Especially, from the perspective of achieving superior effect of the present invention, such a proportion is preferably from 40 to 99.9 mol %, more preferably from 51 to 99 mol %, and even more preferably from 60 to 95 mol %.

As described above, d3+d4 may be 0 mol %. That is, the polymer according to an embodiment of the present invention may be a polymer containing no repeating unit represented by Formula (3) above and no repeating unit represented by Formula (4) above. In other words, the polymer according to an embodiment of the present invention may be a polymer formed from the repeating unit represented by Formula (1) above and/or the repeating unit represented by Formula (2) above.

Formula (1)+Formula (3)

Among all the repeating units, a proportion of a total of the repeating unit represented by Formula (1) above and the repeating unit represented by Formula (3) above (hereinafter, also referred to as "d1+d3") is 20 mol % or greater. Especially, from the perspective of achieving superior effect of the present invention, such a proportion is preferably from 30 to 99 mol %, and more preferably from 50 to 99 mol %.

Formula (2)+Formula (4)

Among all the repeating units, a proportion of a total of the repeating unit represented by Formula (2) above and the repeating unit represented by Formula (4) above (hereinafter, also referred to as "d2+d4") is 80 mol % or less. Especially, from the perspective of achieving superior effect of the present invention, such a proportion is preferably from 0.01 to 70 mol %, and more preferably from 1 to 50 mol %.

d2+d4 may be 0 mol %. That is, the polymer according to an embodiment of the present invention may be a polymer containing no repeating unit represented by Formula (2) above and no repeating unit represented by Formula (4) above. In other words, the polymer according to an embodiment of the present invention may be a polymer formed from the repeating unit represented by Formula (1) above and/or the repeating unit represented by Formula (3) above.

Note that, hereinafter, "d1 (mol %), d2 (mol %), d3 (mol %), d4 (mol %)" are also referred to as "d1/d2/d3/d4".

Molecular Weight

Weight Average Molecular Weight

The weight average molecular weight (Mw) of the polymer according to an embodiment of the present invention is not particularly limited; however, from the perspective of achieving superior effect of the present invention, the weight average molecular weight is preferably from 100 to 10000000, and more preferably from 200 to 1000000.

Number Average Molecular Weight

The number average molecular weight (Mn) of the polymer according to an embodiment of the present invention is not particularly limited; however, from the perspective of achieving superior effect of the present invention, the number average molecular weight is preferably from 100 to 10000000, and more preferably from 200 to 1000000.

Molecular Weight Distribution

The molecular weight distribution (Mw/Mn) of the polymer according to an embodiment of the present invention is not particularly limited; however, from the perspective of achieving superior effect of the present invention, the molecular weight distribution is preferably 10 or less, and more preferably 5 or less. The lower limit of the molecular weight distribution is not particularly limited but is typically 1.0 or greater.

Note that the Mw and Mn described above is a value of obtained by gel permeation chromatography (GPC) measurement, calibrated with polystyrene standard, under the following conditions.
Solvent: Tetrahydrofuran
Detector: RI detector

Glass Transition Temperature

The glass transition temperature (Tg) of the polymer according to an embodiment of the present invention is not particularly limited; however, from the perspective of achieving superior effect of the present invention, the glass transition temperature is preferably from −150 to 200° C., and more preferably from −120 to 150° C.

Note that, in the present specification, the glass transition temperature (Tg) is determined by measuring at a temperature increase rate of 10° C./min by using a differential scanning calorimeter (DSC) and calculating by the midpoint method.

Use

The polymer according to an embodiment of the present invention has excellent resistance to oxidation degradation while having excellent mechanical properties, and thus can be suitably used for various plastic materials and rubber materials.

Method of Producing Polymer

The method of producing the polymer according to an embodiment of the present invention described above is not particularly limited; however, from the perspectives of achieving superior effect of the present invention for the resulting polymer, a method in which a diene polymer and an aromatic hydrocarbon that may have a substituent are reacted in the presence of a Lewis acid catalyst, (hereinafter, also referred to as "method according to an embodiment of the present invention") is preferred. Note that, hereinafter, "achieving superior effect of the present invention for the resulting polymer" is simply referred to as "achieving superior effect of the present invention".

As described above, in the method according to an embodiment of the present invention, the diene polymer and the aromatic hydrocarbon that may have a substituent are reacted in the presence of the Lewis acid catalyst.

The reason for obtaining the polymer according to an embodiment of the present invention described above by the method according to an embodiment of the present invention is roughly presumed to be as follows. That is, by the Lewis acid catalyst, a proton is added to a double bond of the diene polymer to form a carbocation. It is conceived that the formed carbocation then undergoes electrophilic substitution of the aromatic hydrocarbon that may have a substituent to provide a polymer according to an embodiment of the present invention described above (Friedel-Crafts type).

A specific example of the method according to an embodiment of the present invention is shown below using a reaction formula.

In the following reaction formula, the Lewis acid catalyst is aluminum chloride ($AlCl_3$), and the diene polymer is a butadiene rubber (BR); and the following reaction formula shows a reaction formula of a part of the polymer (a part of the high molecular chain) of an aspect in the case where the aromatic hydrocarbon is toluene. In the reaction formula, Ty represents a tolyl group.

[Chemical Formula 4]

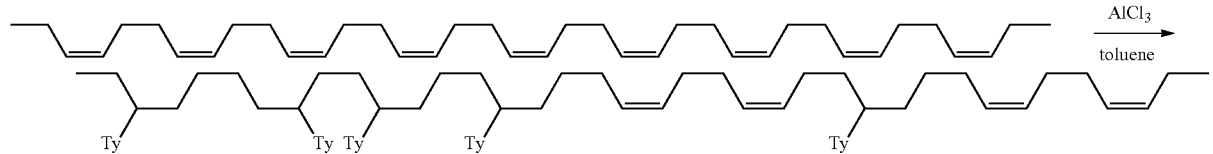

As shown in the reaction formula above, among double bonds of the butadiene rubber, the double bond reacted with toluene becomes a single bond and forms a structure in which a tolyl group derived from toluene is bonded. Furthermore, a double bond that did not react remains as a double bond. The polymer according to an embodiment of the present invention described above can be obtained as described above.

Note that, when the proportion of the reacted double bonds relative to all double bonds is a "proportion of modification", the proportion of modification in the reaction formula is approximately 56% (=5/9). The proportion of modification can be changed by adjusting, for example, the reaction temperature, the reaction time, and the proportion of the used amount of the aromatic hydrocarbon that may have a substituent relative to the used amount of the diene polymer.

The components used in the method according to an embodiment of the present invention are described below.

Diene Polymer

The diene polymer is a polymer containing the repeating unit represented by Formula (3) above (1,4-structure) and/or the repeating unit represented by Formula (4) above (vinyl structure). Among all the repeating units, the proportion of the repeating unit represented by Formula (3) above is 20 mol % or greater, and among all the repeating units, the proportion of the repeating unit represented by Formula (4) above is 80 mol % or less.

The repeating unit represented by Formula (3) above and the repeating unit represented by Formula (4) above are as described above.

Note that, in the diene polymer, the order of the repeating units is not particularly limited.

Furthermore, the repeating unit represented by Formula (3) above is not distinguishing geometric isomers. That is, the repeating unit represented by Formula (3) above contains both the cis structure and the trans structure.

As described above, in the diene polymer, the proportion of the repeating unit represented by Formula (3) above is 20 mol % or greater among all the repeating units. Among these, from the perspective of achieving superior effect of the present invention, the proportion is preferably from 30 to 95 mol %, and more preferably from 60 to 90 mol %.

As described above, in the diene polymer, among all the repeating units, the proportion of the repeating unit represented by Formula (4) above is 80 mol % or less. Among these, from the perspective of achieving superior effect of the present invention, the proportion is preferably from 1 to 70 mol %, and more preferably from 5 to 60 mol %.

Note that, hereinafter, "the proportion (mol %) of the repeating unit represented by Formula (3) above (1,4-structure) among all the repeating units, the proportion (mol %) of the repeating unit represented by Formula (4) above (vinyl structure) among all the repeating units" is also referred to as "1,4-structure/vinyl structure".

Specific examples of the diene polymer include butadiene rubber (BR), isoprene rubber (IR), and chloroprene rubber (CR). Among these, from the perspective of achieving superior effect of the present invention, BR is preferred.

The molecular weight of the diene polymer is not particularly limited. The preferred aspects and the reason thereof of the Mw, Mn, and Mw/Mn of the diene polymer are the same as those for the polymer according to an embodiment of the present invention described above.

Lewis Acid Catalyst

The Lewis acid catalyst is not particularly limited, and one that is known can be used.

Specific examples of the Lewis acid catalyst include aluminum chloride, aluminum bromide, iron chloride, iron bromide, titanium chloride, and titanium bromide. Among these, from the perspective achieving superior effect of the present invention, the Lewis acid catalyst is preferably aluminum chloride.

The used amount of the Lewis acid catalyst is not particularly limited; however, from the perspective of achieving superior effect of the present invention, the used amount is preferably from 0.1 to 10 mass % relative to the used amount of the diene polymer.

Aromatic Hydrocarbon

The aromatic hydrocarbon is not particularly limited.

Specific examples and preferred aspects of the aromatic hydrocarbon include, for example, aromatic hydrocarbons obtained by adding a hydrogen atom to the bonding position of the aromatic hydrocarbon group described above. More specific examples thereof include toluene obtained by adding a hydrogen atom to the bonding position of a tolyl group, anisole obtained by adding a hydrogen atom to the bonding position of a methoxyphenyl group, and naphthalene obtained by adding a hydrogen atom to the bonding position of a naphthyl group. Note that the reason of the preferred aspects is the same as that of the aromatic hydrocarbon group described above.

The used amount of the aromatic hydrocarbon is not particularly limited; however, from the perspective of achieving superior effect of the present invention, the used amount is preferably from 1 to 100000 mass % relative to the used amount of the diene polymer.

Reaction Conditions

In the method according to an embodiment of the present invention, the reaction conditions are not particularly limited; however, the reaction temperature is preferably from 40 to 120° C. from the perspective of achieving superior effect of the present invention, and the reaction time is preferably from 0.1 to 1000 hours from the perspective of achieving superior effect of the present invention.

Reaction Termination Method

In the method according to an embodiment of the present invention, the reaction termination method is not particularly limited. Examples of the reaction termination method include a method in which the Lewis acid catalyst is deactivated by alcohol (preferably methanol).

Rubber Composition

The rubber composition according to an embodiment of the present invention is a rubber composition containing a rubber component containing the polymer according to an embodiment of the present invention described above, and carbon black and/or silica (hereinafter, also simply referred to as "composition according to an embodiment of the present invention").

The rubber composition of an embodiment of the present invention is thought to achieve the effects described above as a result of having such a configuration. Although the reason for this is not clear, it is conceived that, as is clear from Formula (1) to Formula (4) described below, because the polymer according to an embodiment of the present invention used in the rubber composition according to an embodiment of the present invention contains no aromatic vinyl linkage having a small bond energy, the polymer is less likely to be cut by, for example, oxidation.

Each of the components contained in the composition according to an embodiment of the present invention is described below.

Rubber Component

The rubber component contained in the rubber composition according to an embodiment of the present invention contains the polymer according to an embodiment of the present invention described above.

The polymer according to an embodiment of the present invention is as described above.

The content of the polymer according to an embodiment of the present invention in the rubber component is not particularly limited; however, from the perspective of achieving superior effect of the present invention, the content is preferably 10 mass % or greater, more preferably 50 mass % or greater, and even more preferably 90 mass % or greater. The upper limit thereof is not particularly limited and is 100 mass %.

The rubber component may contain another rubber component besides the polymer according to an embodiment of the present invention described above. Examples of such a rubber component (preferably diene rubber) include natural rubber (NR), isoprene rubber (IR), butadiene rubber (BR), styrene-butadiene-rubber (SBR), acrylonitrile-butadiene copolymer rubber (NBR), butyl rubber (IIR), halogenated butyl rubber (Br-IIR, Cl-IIR), and chloroprene rubber (CR).

The content of such another rubber component in the rubber component is not particularly limited; however, from the perspective of achieving superior effect of the present invention, the content is preferably from 0 to 30 mass %.

Carbon Black and/or Silica

The composition according to an embodiment of the present invention contains carbon black and/or silica. The composition according to an embodiment of the present invention preferably contains carbon black and silica from the perspective of achieving superior effect of the present invention.

Hereinafter, carbon black and silica are collectively referred to as "fillers".

Carbon Black

The composition according to an embodiment of the present invention preferably contains carbon black from the perspective of achieving superior effect of the present invention. As the carbon black, a single type of carbon black may be used alone, or two or more types of carbon blacks may be used in combination.

The carbon black is not particularly limited and, for example, carbon blacks of various grades, such as SAF-HS, SAF, ISAF-HS, ISAF, ISAF-LS, IISAF-HS, HAF-HS, HAF, HAF-LS, FEF, GPF, and SRF can be used.

The nitrogen adsorption specific surface area ($N_2SA$) of the carbon black is not particularly limited but is preferably from 50 to 200 m²/g, and more preferably from 70 to 150 m²/g, from the perspective of achieving superior effect of the present invention.

Note that the nitrogen adsorption specific surface area ($N_2SA$) is a value of the amount of nitrogen adsorbed to the surface of carbon black, measured in accordance with JIS K6217-2:2001 "Part 2: Determination of specific surface area—Nitrogen adsorption methods—Single-point procedures".

In the composition according to an embodiment of the present invention, the content of the carbon black is not particularly limited; however, from the perspective of achieving superior effect of the present invention, the content is preferably from 1 to 100 parts by mass, and more preferably from 2 to 10 parts by mass, per 100 parts by mass of the rubber component described above.

Silica

The composition according to an embodiment of the present invention preferably contains silica from the perspective of achieving superior effect of the present invention. One type of the silica may be used alone, or two or more types of the silicas may be used in combination.

The silica is not particularly limited, and any known silica can be used.

Specific examples of the silica include wet silica, dry silica, fumed silica, and diatomaceous earth.

The cetyltrimethylammonium bromide (CTAB) adsorption specific surface area (hereinafter, "CTAB adsorption specific surface area" is also simply referred to as "CTAB") of the silica is not particularly limited but is preferably from 100 to 300 m²/g, and more preferably from 150 to 200 m²/g, from the perspective of achieving superior effect of the present invention.

Note that the CTAB adsorption specific surface area is a value of the amount of CTAB adsorbed to the surface of silica measured in accordance with JIS K6217-3:2001 "Part 3: Determination of specific surface area—CTAB adsorption methods".

In the composition according to an embodiment of the present invention, the content of the silica is not particularly limited; however, from the perspective of achieving superior effect of the present invention, the content is preferably 10 parts by mass or greater, more preferably from 30 to 200 parts by mass, and even more preferably from 50 to 120 parts by mass, per 100 parts by mass of the rubber component described above.

Optional Component

The composition according to an embodiment of the present invention may further contain another component besides the component described above (optional component) as necessary within the scope that does not impair the effect or purpose thereof.

Examples of such another component include various additives that are typically used in rubber compositions, such as fillers other than the carbon black and the silica, silane coupling agents, terpene resins (preferably aromatic modified terpene resins), thermally expandable microcapsules, zinc oxide (flower of zinc), stearic acid, anti-aging agents, waxes, processing aids, process oils, liquid polymers, thermosetting resins, vulcanizing agents (e.g. sulfur), and vulcanization accelerators.

Silane Coupling Agent

The composition according to an embodiment of the present invention preferably contains silane coupling agent from the perspective of achieving superior effect of the present invention. The silane coupling agent is not particularly limited as long as the silane coupling agent is a silane compound having a hydrolyzable group and an organic functional group.

The hydrolyzable group is not particularly limited; however, examples thereof include alkoxy groups, phenoxy groups, carboxyl groups, and alkenyloxy groups. Among these, from the perspective of achieving superior effect of the present invention, the hydrolyzable group is preferably an alkoxy group. When the hydrolyzable group is an alkoxy group, the number of carbon atoms of the alkoxy group is preferably from 1 to 16, and more preferably from 1 to 4, from the perspective of achieving superior effect of the present invention. Examples of the alkoxy group having from 1 to 4 carbons include a methoxy group, an ethoxy group, and a propoxy group.

The organic functional group is not particularly limited but is preferably a group that can form a chemical bond with an organic compound. Examples of the organic functional group include an epoxy group, a vinyl group, an acryloyl group, a methacryloyl group, an amino group, a sulfide group, a mercapto group, a blocked mercapto group (protected mercapto group) (e.g. octanoylthio group). Among these, from the perspective of achieving superior effect of the present invention, a sulfide group (especially, disulfide group, tetrasulfide group), a mercapto group, and a blocked mercapto group are preferred.

A single type of silane coupling agent may be used alone, or two or more types of silane coupling agents may be used in combination.

From the perspective of achieving superior effect of the present invention, the silane coupling agent is preferably a sulfur-containing silane coupling agent.

Specific examples of the silane coupling agent include bis(3-triethoxysilylpropyl)tetrasulfide, bis(3-trimethoxysilylpropyl)tetrasulfide, bis(3-triethoxysilylpropyl)disulfide, mercaptopropyltrimethoxysilane, mercaptopropyltriethoxysilane, 3-trimethoxysilylpropyl-N,N-dimethylthiocarbamoyl-tetrasulfide, trimethoxysilylpropyl-mercaptobenzothiazole tetrasulfide, triethoxysilylpropyl-methacrylate-monosulfide, dimethoxymethylsilylpropyl-N,N-dimethylthiocarbamoyl-tetrasulfide, and 3-octanoylthio-1-propyltriethoxysilane. One of these can be used alone, or a combination of two or more of these can be used.

In the composition according to an embodiment of the present invention, the content of the silane coupling agent is not particularly limited; however, from the perspective of achieving superior effect of the present invention, the content is preferably from 2 to 20 mass %, and more preferably from 5 to 15 mass %, relative to the content of the silica described above.

Use

The composition according to an embodiment of the present invention is suitably used for tires, conveyor belts, hoses, vibration-proofing materials, rubber rolls, and outside hoods of railway vehicles. In particular, the composition is suitably used for tires (pneumatic tires).

Method of Producing Rubber Composition

The method of producing the composition according to an embodiment of the present invention is not particularly limited, and specific examples thereof include a method whereby each of the above-mentioned components is kneaded using a publicly known method and device (e.g. Banbury mixer, kneader, and roll). When the composition according to an embodiment of the present invention contains a sulfur and/or a vulcanization accelerator, the components other than the sulfur and/or the vulcanization accelerator are preferably blended first at a high temperature (preferably from 50 to 160° C.) and then cooled before the sulfur and/or the vulcanization accelerator is blended.

In addition, the composition according to an embodiment of the present invention can be vulcanized or crosslinked under known vulcanizing or crosslinking conditions.

Pneumatic Tire

The pneumatic tire according to an embodiment of the present invention is a pneumatic tire produced using the composition according to an embodiment of the present invention described above. In particular, a pneumatic tire, in which the composition according to an embodiment of the present invention is used (arranged) in the tire tread (cap tread), is preferred.

FIG. 1 is a partial cross-sectional schematic view of a pneumatic tire that represents a pneumatic tire according to an embodiment of the present invention, but the pneumatic tire according to an embodiment of the present invention is not limited to the embodiment illustrated in FIG. 1.

In FIG. 1, reference sign 1 denotes a bead portion, reference sign 2 denotes a sidewall portion, and reference sign 3 denotes a tire tread portion.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire circumference of the tire on the outer side of the carcass layer 4.

Additionally, rim cushions 8 are provided in portions of the bead portions 1 that are in contact with a rim.

Note that the tire tread portion 3 is formed from the composition according to an embodiment of the present invention described above.

The pneumatic tire according to an embodiment of the present invention can be produced, for example, in accordance with a known method. In addition, as a gas with which the pneumatic tire is filled, an inert gas such as nitrogen, argon, helium, or the like can be used in addition to a normal air or air whose oxygen partial pressure is adjusted.

EXAMPLE

The present invention is described in further detail below by using examples. However, the present invention is not limited to these examples.

Production of Polymer

The polymer was produced as described below.

Example 1

In toluene (300 mL), 30 g of BR (Mw=8100, Mw/Mn=1.1, 1,4-structure/vinyl structure=69/31) was dissolved and heated to 80° C., and then aluminum chloride (2.0 g) was added and agitated for 8 hours. Thereafter, the reaction was terminated by adding methanol. Then, the reaction solution was concentrated under reduced pressure, the concentrated reaction solution was added to methanol (500 mL), and the methanol-insoluble component was separated to obtain 35 g of a polymer.

The obtained polymer was a polymer formed from the repeating unit represented by Formula (1) above and the repeating unit represented by Formula (2) above, and the repeating unit represented by Formula (3) above and the repeating unit represented by Formula (4) above. In Formula (1) and Formula (2), one of $R^1$ and $R^2$ represents a tolyl group, and the other represents a hydrogen atom. Furthermore, in Formula (1) to Formula (4), $R^x$ and $R^y$ each represent a hydrogen atom.

Furthermore, d1/d2/d3/d4 of the obtained polymer was 7/3/62/28, Mw was 9800, Mw/Mn was 1.7, and Tg was −75° C.

Example 2

In anisole (300 mL), 30 g of BR (Mw=4.6×10$^5$, Mw/Mn=2.9, 1,4-structure/vinyl structure=99/1) was dissolved and heated to 80° C., and then aluminum chloride (1.0 g) was added and agitated for 4 hours. Thereafter, the reaction was terminated by adding methanol. Then, the reaction solution was concentrated under reduced pressure, the concentrated reaction solution was added to methanol (500 mL), and the methanol-insoluble component was separated to obtain 38 g of a polymer.

The obtained polymer was a polymer formed from the repeating unit represented by Formula (1) above and the repeating unit represented by Formula (2) above, and the repeating unit represented by Formula (3) above and the repeating unit represented by Formula (4) above. In Formula (1) and Formula (2), one of R$^1$ and R$^2$ represents a methoxyphenyl group, and the other represents a hydrogen atom. Furthermore, in Formula (1) to Formula (4), R$^x$ and R$^y$ each represent a hydrogen atom.

Furthermore, d1/d2/d3/d4 of the obtained polymer was 15/0.2/84/0.8, Mw was 3.4×10$^5$, Mw/Mn was 2.6, and Tg was −65° C.

Example 3

In anisole (300 mL), 30 g of BR (Mw=8100, Mw/Mn=1.1, 1,4-structure/vinyl structure=69/31) was dissolved and heated to 80° C., and then aluminum chloride (1.0 g) was added and agitated for 8 hours. Thereafter, the reaction was terminated by adding methanol. Then, the reaction solution was concentrated under reduced pressure, the concentrated reaction solution was added to methanol (500 mL), and the methanol-insoluble component was separated to obtain 85 g of a polymer.

The obtained polymer was a polymer formed from the repeating unit represented by Formula (1) above and the repeating unit represented by Formula (2) above. In Formula (1) and Formula (2), one of R$^1$ and R$^2$ represents a methoxyphenyl group, and the other represents a hydrogen atom. Furthermore, in Formula (1) and Formula (2), R$^x$ and R$^y$ each represent a hydrogen atom.

Furthermore, d1/d2/d3/d4 of the obtained polymer was 69/31/0/0, Mw was 9200, Mw/Mn was 1.5, and Tg was 123° C.

Comparative Example 1

An ethylene-styrene-butadiene polymer was produced by polymerizing ethylene, styrene, and butadiene by using Patent Document 1 as a reference. In the obtained polymer, presence of styrene linkage (aromatic vinyl linkage) was confirmed.

Comparative Example 2

An ethylene-styrene polymer was produced by polymerizing ethylene and styrene, by using Example 1 of Patent Document 2 as a reference. In the obtained polymer, presence of styrene linkage (aromatic vinyl linkage) was confirmed.

The structures of the obtained polymers are shown collectively in Table 1 below.

TABLE 1

|  | Example 1 | Example 2 | Example 3 | Comparative Example 1 | Comparative Example 2 |
|---|---|---|---|---|---|
| Aromatic hydrocarbon group | Tolyl group | Methoxyphenyl group | Methoxyphenyl group | — | — |
| d1 | 7 | 15 | 69 | — | — |
| d2 | 3 | 0.2 | 31 | — | — |
| d3 | 62 | 84 | 0 | — | — |
| d4 | 28 | 0.8 | 0 | — | — |
| d1 + d2 | 10 | 15.2 | 100 | — | — |
| d3 + d4 | 90 | 84.8 | 0 | — | — |
| d1 + d3 | 69 | 99 | 69 | — | — |
| d2 + d4 | 31 | 1 | 31 | — | — |
| Aromatic vinyl linkage | No | No | No | Yes | Yes |

In Table 1, the row of the aromatic hydrocarbon group shows the aromatic hydrocarbon group represented by R$^1$ or R$^2$ in Formula (1) and Formula (2) above.

Furthermore, in Table 1, the rows of d1 to d4, d1+d2, d3+d4, d1+d3, and d2+d4 represents d1 to d4, d1+d2, d3+d4, d1+d3, and d2+d4, respectively.

Furthermore, in Table 1, the row of the aromatic vinyl linkage shows presence or absence of the aromatic vinyl linkage described above.

Resistance to Oxidation Degradation

By heating each of the obtained polymers, Mw maintenance rate before and after the heating (=Mw after heating/Mw before heating) was determined. As a result, compared to Comparative Examples 1 and 2, which contained the aromatic vinyl linkages, each of Examples 1 to 3, which is a polymer according to an embodiment of the present invention and contained no aromatic vinyl linkage, exhibited a high Mw maintenance rate and excellent resistance to oxidation degradation.

Preparation of Rubber Composition

The components shown in Table 2 below were compounded in the proportions (part by mass) shown in the same table.

Specifically, the components shown in Table 2 below except for the sulfur and the vulcanization accelerator were first mixed in a Bunbury mixer with a temperature of 60° C. for 5 minutes. Thereafter, a roll was used to mix the sulfur and the vulcanization accelerator to obtain a rubber composition.

Evaluation

The following evaluations were performed for each of the obtained rubber compositions.

Toughness

A vulcanized rubber sheet was prepared by press-vulcanizing each of the obtained (unvulcanized) rubber compositions for 15 minutes at 160° C. in a mold (15 cm×15 cm×0.2 cm). Then, a dumbbell-shaped JIS No. 3 test piece (thickness: 2 mm) was punched from the obtained vulcanized rubber sheet in accordance with JIS K6251:2010. The evaluation of strength at break and elongation at break were performed at a temperature of 20° C. at a pulling speed of 500 mm/min. The toughness parameter was determined based on the following equation.

Toughness parameter=Strength at break×Elongation at break

The results are shown in Table 2. The results are expressed as index values with the toughness parameter of Comparative Example A1 being assigned the index value of 100. A larger index value indicates superior toughness.

Resistance to Oxidation Degradation

The vulcanized rubber sheet produced as described above was heated in the air (80° C. for 100 hours). The strength at break and the elongation at break were then evaluated in the same manner as in the evaluation of the toughness described above to determine the toughness parameter (after heating). The maintenance rate was determined based on the following equation.

Maintenance rate=Toughness parameter after heating/Toughness parameter before heating×100 (%)

The results are shown in Table 2. A larger maintenance rate indicates superior resistance to oxidation degradation.

Amount of Bound Rubber

In a metal mesh basket, 0.5 g of the obtained rubber composition (unvulcanized) was placed, immersed in 300 mL of toluene at room temperature for 72 hours, and then taken out and dried. By measuring the mass of the sample, the amount of the bound rubber was calculated based on the following equation.

Amount of bound rubber=[(sample mass after being immersed in toluene and dried)−(mass of carbon black and/or silica)]/(mass of rubber component)

Note that, when a combination of carbon black and silica is used, the mass of carbon black and/or silica is the total amount of these in the equation above. A larger index value of the bound rubber indicates a greater amount of bound rubber (rubber reacted with the carbon black and/or the silica), and indicates superior dispersibility (filler dispersibility) of the carbon black and/or the silica.

TABLE 2

|   | Comparative Example A1 | Comparative Example A2 | Comparative Example A3 | Comparative Example A4 | Example A1 | Example A2 | Example A3 |
|---|---|---|---|---|---|---|---|
| SBR-1 | 100 | | | | | | 50 |
| SBR-2 | | 100 | | | | | |
| BR | | | 100 | | | | |
| Comparative polymer | | | | 100 | | | |
| Specific polymer 1 | | | | | 100 | | 50 |
| Specific polymer 2 | | | | | | 100 | |
| Carbon black | 5 | 5 | 5 | 5 | 5 | 5 | 5 |
| Silica | 70 | 70 | 70 | 70 | 70 | 70 | 70 |
| Silane coupling agent | 6 | 6 | 6 | 6 | 6 | 6 | 6 |
| Anti-aging agent | 3 | 3 | 3 | 3 | 3 | 3 | 3 |
| Zinc oxide | 3 | 3 | 3 | 3 | 3 | 3 | 3 |
| Stearic acid | 2 | 2 | 2 | 2 | 2 | 2 | 2 |
| Oil | 10 | 10 | 10 | 10 | 10 | 10 | 10 |
| Vulcanization accelerator | 1.2 | 1.2 | 1.2 | 1.2 | 1.2 | 1.2 | 1.2 |
| Sulfur | 1.5 | 1.5 | 1.5 | 1.5 | 1.5 | 1.5 | 1.5 |
| Toughness | 100 | 108 | 103 | 109 | 117 | 131 | 111 |
| Resistance to oxidation degradation | 76 | 82 | 88 | 87 | 92 | 95 | 90 |
| Amount of bound rubber (%) | 41 | 40 | 43 | 45 | 49 | 56 | 46 |

The details of each component shown in Table 2 above are as follows.

SBR-1: NIPOL 1502 (emulsion polymerized SBR), available from Zeon Corporation

SBR-2: Tufdene 2000R (solution polymerized SBR), available from Asahi Kasei Corporation BR: NIPOL BR 1220, available from Zeon Corporation Comparative polymer: Polymer of Comparative Example 1 produced as described above Specific polymer 1: Polymer of Example 1 produced as described above Specific polymer 2: Polymer of Example 2 produced as described above Carbon black: Show Black N220, available from Cabot Japan (nitrogen adsorption specific surface area: 111 m$^2$/g)

Silica: ZEOSIL 1165MP, available from Solvay

Silane coupling agent: Si69, available from Evonik Degussa

Anti-aging agent: Santoflex 6PPD, available from Flexsys

Zinc oxide: Zinc Oxide III, available from Seido Chemical Industry Co., Ltd.

Stearic acid: Stearic acid, available from NOF Corporation

Oil: A-OMIX, available from Sankyo Yuka Kogyo K.K.
Vulcanization accelerator: NOCCELER NS-P, available from Ouchi Shinko Chemical Industrial Co., Ltd.
Sulfur: Golden Flower oil treated sulfur powder, available from Tsurumi Chemical Industry, Co., Ltd.

As is clear from Table 2, compared to Comparative Examples A1 to A4 that did not contain the polymer according to an embodiment of the present invention, Examples A1 to A3 that contained the polymer according to an embodiment of the present invention exhibited excellent toughness and resistance to oxidation degradation. Among these, Examples A1 to A2, in which the content of the polymer according to an embodiment of the present invention in the rubber component was 70 mass % or greater, exhibited superior toughness and resistance to oxidation degradation as well as excellent filler dispersibility. Of these, Example A2, in which the substituent of the aromatic hydrocarbon group that may have a substituent represented by $R^1$ or $R^2$ in Formula (1) and Formula (2) was an electron donating group having the Hammett substituent constant $\sigma_p$ of −0.15 or less, exhibited even better toughness and resistance to oxidation degradation as well as excellent filler dispersibility.

REFERENCE SIGNS LIST

1 Bead portion
2 Sidewall portion
3 Tire tread portion
4 Carcass layer
5 Bead core
6 Bead filler
7 Belt layer
8 Rim cushion

The invention claimed is:
1. A rubber composition comprising a rubber component containing a polymer and carbon black and/or silica,
the polymer comprising a repeating unit represented by Formula (1), a repeating unit represented by Formula (2), a repeating unit represented by Formula (3) and a repeating unit represented by Formula (4), wherein
among all the repeating units, the proportion of a total of the repeating unit represented by Formula (1) is 5 mol % or greater;
among all the repeating units, the proportion of the repeating unit represented by Formula (3) is 20 mol % or greater; and
among all the repeating units, the proportion of the repeating unit represented by Formula (2) and the repeating unit represented by Formula (4) is from 1 to 80 mol %:

[Chemical Formula 1]

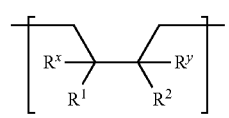

(1)

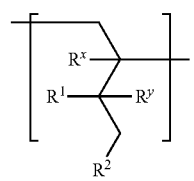

(2)

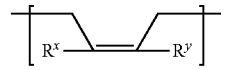

(3)

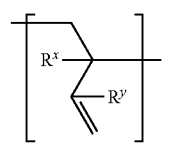

(4)

where in Formula (1) and Formula (2), for $R^1$ or $R^2$, one represents an aromatic hydrocarbon group that may have at least one substituent, and the other represents a hydrogen atom, and
in Formula (1) to Formula (4), $R^X$ and $R^Y$ each represent a hydrogen atom, an alkyl group, or a halogen atom while at least one of $R^X$ and $R^Y$ represents a hydrogen atom.

2. The rubber composition according to claim 1, wherein a content of the silica is 10 parts by mass or greater per 100 parts by mass of the rubber component.

* * * * *